United States Patent [19]

Degner et al.

[11] 4,226,706
[45] Oct. 7, 1980

[54] DISPERSED AIR FLOTATION MACHINE

[75] Inventors: Vernon R. Degner, Carmichael; William V. Colbert, Lodi, both of Calif.

[73] Assignee: Envirotech Corporation, Menlo Park, Calif.

[21] Appl. No.: 65,028

[22] Filed: Aug. 9, 1979

Related U.S. Application Data

[63] Continuation of Ser. No. 918,982, Jun. 26, 1978, abandoned, and a continuation-in-part of Ser. No. 791,102, Apr. 26, 1977, Pat. No. 4,110,210, which is a continuation of Ser. No. 583,072, Jun. 2, 1975, abandoned, said Ser. No. 918,982, is a continuation of Ser. No. 695,881, Jun. 14, 1976, abandoned.

[51] Int. Cl.³ ............................................. B03D 1/14
[52] U.S. Cl. ............................... 209/170; 210/221 P; 210/221 R; 261/77
[58] Field of Search .................... 209/164, 168–170; 261/76, 77, 78 A, DIG. 75; 210/44, 195 R, 221 P, 221 R; 239/424

[56] References Cited

U.S. PATENT DOCUMENTS

| | | | |
|---|---|---|---|
| 1,380,665 | 6/1921 | Lyster | 209/170 |
| 2,174,540 | 10/1939 | Wallace et al. | 261/77 |
| 2,651,413 | 9/1953 | Daman | 209/168 |
| 2,999,595 | 9/1961 | Schoeld et al. | 209/170 |
| 3,053,390 | 9/1962 | Wood | 209/169 |
| 3,146,195 | 8/1964 | Berardi | 261/77 |
| 3,400,818 | 9/1968 | Tarjan | 261/DIG. 74 |
| 3,446,353 | 5/1969 | Davis | 261/77 |

Primary Examiner—Frank W. Lutter
Assistant Examiner—Gregory N. Clements
Attorney, Agent, or Firm—Hal J. Bohner; Robert E. Krebs

[57] ABSTRACT

A machine for dispersing gas bubbles in a liquid includes a horizontal series of adjacent flotation cells without baffles or mechanical gas distribution means. In each cell, an ejection device is mounted to expel a two-phase gas-liquid mixture into the cell. Liquid is pumped into the ejection devices so that the density and energy of the mixture at the point of ejection falls within Region I In FIG. 3.

15 Claims, 3 Drawing Figures

DISPERSED AIR FLOTATION MACHINE

This is a continuation of application Ser. No. 918,982, filed June 26, 1978, now abandoned, which is a continuation of application Ser. No. 695,881, filed June 14, 1976, now abandoned. Also, this is a continuation-in-part of application Ser. No. 791,102, filed Apr. 26, 1977, now U.S. Pat. No. 4,110,210, issued Aug. 29, 1978, which is a continuation of application Ser. No. 583,072, filed June 2, 1975 and now abandoned.

BACKGROUND OF THE INVENTION

1. Field of the Invention

The present invention generally relates to improved apparatus for dispersing gas bubbles throughout a liquid body.

2. State of the Art

It is well known to distribute gas bubbles in a liquid body in order to accomplish, for example, solid-liquid or liquid-liquid separation by flotation. Such flotation techniques are commonly used for separating and concentrating valuable minerals and chemicals, for removing particulates from liquid bodies and for separating various liquids. A typical flotation process in the mineral beneficiation art, for example, includes the steps of conditioning an aqueous pulp or slurry of crushed ore with a chemical flotation aid and then dispersing air bubbles within the pulp to produce a surface froth relatively rich in the desired mineral. In the field of oil production, similar flotation processes are frequently used to separate crude oil from water prior to the reinjection of the water into a well or prior to surface disposal of the water. In flotation processes in general, it is important to maximize contact between the froth-producing gas bubbles and the materials which are to be floated and, at the same time, to maintain the surface of the liquid body fairly quiescent so that the froth is not agitated so much as the cause the floated materials to separate from the gas bubbles to which they have become attached.

Dispersed gas flotation, as distinguished from dissolved gas flotation, achieves physical separation of a contaminating substance from a body of primary liquid by effecting contact between the contaminating substance, which may be either solid particles or a second liquid, and gas bubbles without first dissolving the gas in the primary liquid. Having achieved contact, the contaminating materials attach to the gas bubbles and rise buoyantly to the surface of the primary liquid as a froth which can be subsequently removed, as by skimming. In dispersed gas flotation systems, it is important to achieve small gas bubbles (i.e. high surface-to-volume ratio), good mixing to assure high gas-particle contact probability, minimum short circuiting of the primary liquid, and a highly concentrated contaminant level in the removal stream.

Conventional dispersed gas flotation systems, which utilize mechanical impellers in flotation cells to ingest gas into liquids, have inherent features which preclude their application to many areas, most notably the treatment of wastewater in municipal plants and in pulp and paper mills. Attempts to apply mechanical-type gas flotation devices in such areas have failed because of the inherently high degree of fluid turbulence produced by the impellers within the separation zone of the flotation cells and the necessity for baffles in the mixing zones of the cells. In pulp and paper applications, for example, high fluid turbulence will break up the relatively weak floc in the wastewater. In municipal waste treatment or when treating wastewater from meat-packing plants, as another example, the mechanical elements and baffles in conventional gas flotation systems foul due to the presence of "stringy-type" solids.

An example of a mechanical-type flotation machine, which includes a rotatable impeller to aspirate gas into a liquid body in a vessel and to agitate the liquid to distribute the gas is shown in U.S. Pat. No. 3,491,880 to W. H. Reck. Flotation machines which utilize one or more gas injection nozzles in combination with a baffle arrangement to distribute gas within a liquid body are shown in U.S. Pat. Nos. 2,008,624; 3,371,779; and 3,446,353. Dissolved air flotation machines, wherein air is dissolved under pressure in a stream of liquid and then the liquid from the stream is injected into a larger body at reduced pressure to liberate bubbles to accomplish flotation, are shown in U.S. Pat. Nos. 2,759,607 and 3,418,236.

OBJECTS OF THE INVENTION

The general object of the present invention is to provide an improved machine for dispersing gas into a liquid body.

Another object is to provide a machine for effecting two-phase fluid into a contained liquid body in a manner to provide a nearly complete dispersion or distribution of gas bubbles throughout the body together with a quiet but frothy surface.

A more specific object is to provide a hydraulically actuated flotation machine and method of operation which eliminates moving parts and stationary baffles from the mixing and separation zones in the machine.

The process which is preferably practiced with out machine is described hereinafter.

BRIEF DESCRIPTION OF THE DRAWINGS

Further objects and advantages of the present invention may be readily ascertained by reference to the following description and appended drawings which are offered by way of illustration only and not in limitation of the invention, whose scope is defined by the appended claims and equivalents. In the drawings:

DETAILED DESCRIPTION OF THE PREFERRED EMBODIMENT

Figure 1:
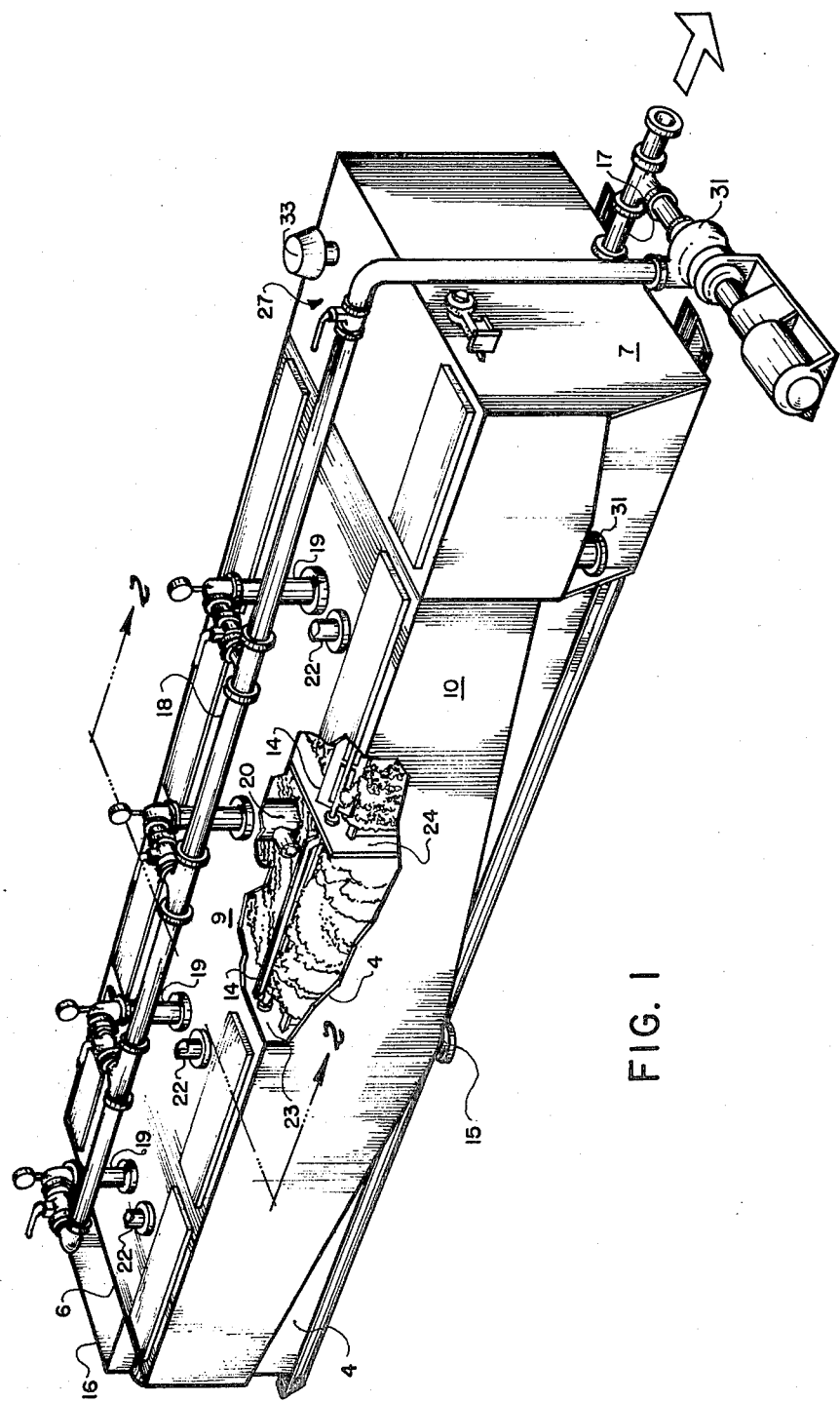
FIG. 1 is a schematic diagram of a flotation machine according to our invention.
Figure 2:
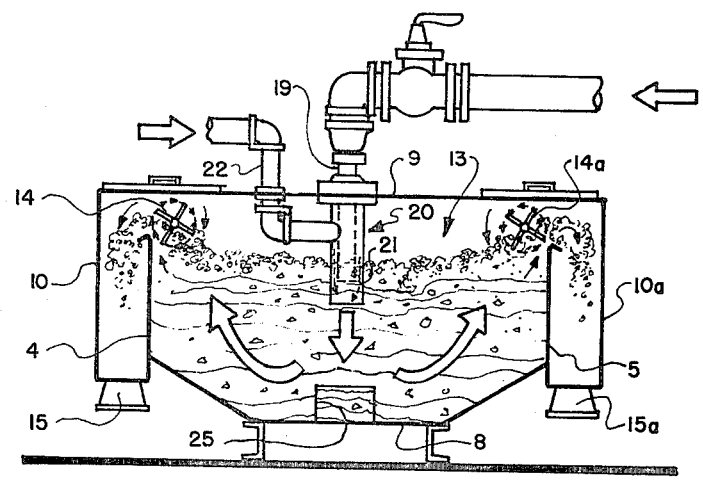
FIG. 2 is a sectional view of the machine of FIG. 1.

The dispersed air flotation machine in FIGS. 1 and 2 generally includes sidewalls 4 and 5, endwalls 6 and 7, a floor 8 and an optional roof 9 which together comprise a housing. Within the housing, flotation cells or compartments are arranged in a horizontal series for holding the liquid to be treated. At least one of the sidewalls, say wall 4, terminates short of the roof 9 and its upper horizontal edge serves as an overflow weir to discharge froth from the cells into an elongated launder box 10 mounted on the sidewall 4. Thus it can be seen that the roof 9 is spaced apart from the surface of the liquid in the cells thereby providing a free surface on the liquid for the formation of froth. Preferably, a conventional rotary paddle wheel device 14 is mounted adjacent the edge of the sidewall 4 to urge froth to discharge over the sidewall into the collection launder 10, from which the froth is carried to discharge via a conduit 15; the paddle wheel drive means is well known and is omitted from the drawings for purposes of clarity. An inlet means, illustrated as a conventional feed box 16, is mounted on the endwall 6 of the housing to admit an influent stream of liquid for processing into the first cell via a conventional underflow weir, not shown, which is located just above the floor 8. An outlet conduit 17 for discharging treated liquid from the machine is fitted through the endwall 7.

The flotation cells are all substantially the same and only one of them, cell 13, is fully shown and will be described in detail. Cell 13 generally comprises a compartment wherein is mounted a two-phase fluid ejection device 20 for introducing a gas-liquid mixture into the contained liquid to form a froth on the liquid surface. The illustrated compartment of cell 13 is rectangular in shape, being comprised of the housing sidewalls 4 and 5, the housing floor 8, and end partition walls 23 and 24, which are preferably solid, mounted transversely between the housing sidewalls 4 and 5. There is an underflow of liquid into and out of each cell via opening 25 formed through the partition walls just above the floor 8; this manner of transferring liquid from cell to cell in a flotation machine is well known and the openings 25 are usually called underflow weirs. It should be noted that the cell 13 does not contain baffles or other gas distribution means.

The illustrated machine also includes an integral skimming compartment 27 which receives treated liquid via an underflow weir from the last flotation cell of the series. The skimming compartment 27 can be understood to be identical to a flotation cell except that it does not contain a two-phase fluid ejection device 20. In the illustrated embodiment, the skimming compartment 27 includes a separate launder box 29 for receiving froth from the compartment, which froth is carried to discharge via a conduit 31. It should also be understood that there is a skimming device mounted in the skimming compartment to urge froth into the launder box 29. Treated liquid is discharged from the skimming compartment via the aforementioned outlet conduit 17.

As mentioned previously, a single one of the ejection devices 20 is fixedly mounted centrally at the free liquid surface in each of the cells to eject a two-phase fluid (e.g. an air water mixture) downwardly into the liquid body from below the liquid surface. Each of the ejection devices 20 is connected, via liquid-carrying branch pipe 19, to a main manifold pipe 18. A pump 31 is connected to the main manifold pipe to force liquid therethrough and then into the ejection devices 20. As will now be explained, the pumped liquid mixes with gas in the ejection devices 20 to form the aforementioned two-phase fluid. As shown, the liquid pumped to the ejection devices 20 can be a fraction of the processed liquid discharged through pipe 17.

As best shown in FIG. 2, each of the ejection devices 20 preferably includes a hollow straight tubular member 21 which is circular in interior cross-section, has uniform inside diameter and an open, unobstructed end. An annular plate having a central aperture is sealingly fixed concentrically to the upper end of the tubular member 21 (hereinafter called the inlet end). The free end of the associated branch pipe 19 is sealingly fitted through the annular plate and extends concentrically into the interior of the tubular member 21 to thereby define an annular space between the exterior wall of the pipe 19 and the interior wall of the tubular member 21. The radial width of the annular space may range from about 20 to 80% of the interior diameter of the tubular member; the preferred range is 20 to 25%. An aperture is formed through the sidewall of the tubular member 21 to communicate with the annular space and a gas-carrying conduit 22 is sealingly fitted into the aperture to convey gas into the annular space. The gas-carrying conduit 22 extends from the ejection devices 20 for connection to a source of pressurized gas or to an outlet which is in gaseous flow communication with the atmosphere above the liquid surface or outside the housing of the flotation machine.

The space within the tubular member 21 between the end of the liquid-carrying branch pipe 19 and the discharge end of the tubular member 21 defines an expansion chamber. The discharge end of the expansion chamber is open and unobstructed. In practice, the ratio of the inside diameter of the expansion chamber to the inside diameter of the branch pipe 19 ranges from about 1.5 to about 3.5 and, preferably, the ratio is at least 2. Further, the length of the expansion chamber is at least twice its diameter and may be twenty or more times its diameter in some applications, such as for gas-liquid contacting; the preferred ratio of the length of the expansion chamber to its inside diameter ranges from about 2 to about 15.

The above-described fluid ejection device is described in our U.S. patent application Ser. No. 695,224, filed June 11, 1976 and now abandoned. Another type of fluid ejection device for use with the present system is described in our U.S. Pat. No. 4,110,210 issued Aug. 29, 1978.

Although the FIG. 1 embodiment shows the ejection devices 20 positioned to expel two-phase fluid downwardly into the liquid-holding vessel 13, the ejection devices can be positioned to eject at some oblique angle into the tank.

To operate fluid ejection devices 20, liquid is pumped at a pressure of, say 3 to 15 psig, through the manifold pipe 18 and then through the branch pipe 19 into the expansion chamber members 21. Upon entering an expansion chamber 21, the pumped liquid creates a low-pressure turbulent region and the low pressure aspirates gas into the expansion chamber from the aforementioned annular space in the expansion chamber. Although natural aspiration from the atmosphere usually draws enough gas into the ejection device to satisfy the operating parameters described hereinafter, a source of pressurized gas can be connected to the gas-carrying pipe 17.

Figure 3:
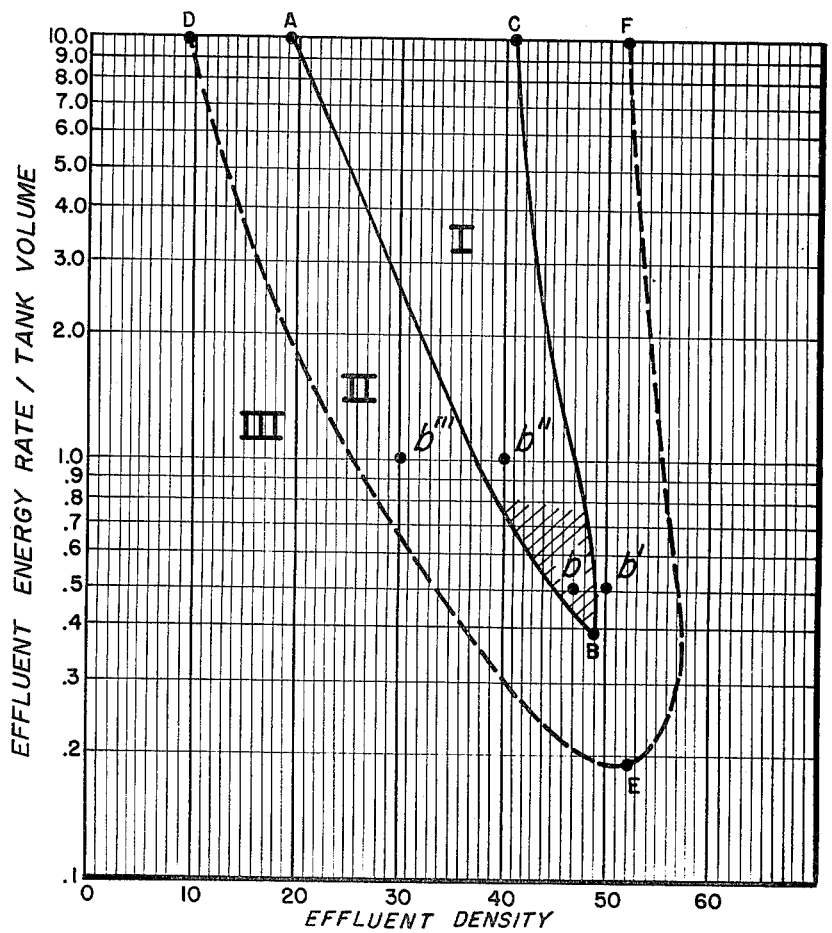
FIG. 3 is a graph illustrating the conditions under which the machine of FIG. 1 is operated.

The machine of FIGS. 1 and 2 is preferably operated such that certain energy-density relationships shown in FIG. 3 are maintained at the outlet ends of ejection devices 20. In the graph in FIG. 3, the vertical axis (ordinate) represents the kinetic energy rate of the two-phase effluent from an ejection device 20 in terms of foot-pound force per cubic-foot volume of the receiving tank 13 per second, and the horizontal axis (abscissa) represents the density of the two-phase effluent from that ejection device in terms of pound force (i.e. weight) per cubic foot. The area I generally bounded by the solid curve ABC in the graph describes the preferred operating region of the machine. Surrounding that region is a transition Region II whose outer boundary is defined by the dashed curve DEF. Outside that boundary is Region III, the so-called undesirable operating region. When the machine is operated under Region I conditions, the liquid body in a cell is filled with gas bubbles and the liquid surface in the cell is relatively quiet but frothy. However, if the machine is operated under Region III conditions, either the gas bubbles are not distributed throughout the liquid body or the liquid surface is excessively turbulent or choppy.

It should be noted that the abscissa of the graph in FIG. 3 is a linear scale on which density values are shown ranging from 10 to 62.4 pounds per cubic foot. Those values are based on tests where the effluent was an air-water mixture. Since the density of water is 62.4 pounds per cubic foot, the density of the two-phase gas-water mixture would necessarily be less than that. It should also be noted that the ordinate is a logarithmic scale and that the energy rates of the two-phase effluent range from one-tenth to ten pounds per square foot per second.

In a sense, the curve AB defines a minimum energy boundary because a point on that curve defines, with respect to a particular effluent density, the minimum energy that can be expended to achieve the desired conditions. In actual practice, we prefer to operate at an energy level above the curve AB in order to provide a margin of safety. Likewise, the curve BC can be understood to define a maximum energy boundary because a point on that curve defines, with respect to a particular effluent density, the maximum energy which can be expended while still maintaining the desired conditions. In practice, we prefer to operate at energy levels well below the boundary BC in order to conserve power. For that reason, the exact location of the curve BC is unimportant to illustrate that the desired conditions will cease to exist if the two-phase effluent energy is too great.

From FIG. 3, one could also observe that it would be preferable to operate at an energy-density point generally within the shaded area of the nose region of the curve ABC if energy usage were to be minimized. We have found, however, that operation there is not desirable from a reliability standpoint because slight changes in the values of the operating parameters can readily give rise to undesirable conditions in the cells. For example, if the machine were set to operate at point b and the effluent density shifted to a point b' (about a 10% increase), the desired conditions in the cell would deteriorate. Such shifts in the operating parameters could result from hydraulic or air blockages and plugging, variations in pump speed, normal mechanical wear experienced during use, and so forth. Therefore, we usually operate substantially to the left and above the shaded area of the nose of Region I, say at point b" in the unshaded portion of the region.

Operation at a point such as b" in Region I which is substantially removed from the shaded area is also preferable for the reason that efficient flotation requires enough gas to provide a large number of bubbles to contact the material which is to be floated. Since the quantity of gas which is introduced to the liquid in a flotation cell is inversely related to the density of two-phase effluent from an ejection device 20, and since the number of bubbles is a generally increasing function of the quantity of gas, operation at point b" (low density) is normally preferred to operation at point b (high density) when the number of gas bubbles is a consideration. The quantitative relationship of the density of the two-phase fluid, $\rho 2\phi$, to the gas flow $Q_A$ and the liquid flow $Q_L$ can be represented by the following expression:

$$\rho 2\phi = \frac{62.4}{1 + \frac{Q_A}{Q_L}}$$

It should be noted that we are discussing here the relative number of bubbles and not the distribution of the bubbles; the bubbles can, of course, be distributed throughout a cell whether there are relatively many or relatively few bubbles.

Preferably, the two-phase fluid ejection devices 20 are positioned with their outlet ends below the surface of the liquid in the cells such that the gas-liquid mixture from the ejection devices impinges upon or sweeps the floors of the cells. The condition of impingement depends upon the depth of the cells as well as the energy of the two-phase effluent. From our observations, we believe that the impingement (or "near" impingement, as that term will be explained hereinafter) on the cell floor is important in achieving good gas bubble distribution and a quiet liquid surface with minimum power usage. We have also found that the distance between the outlet end of an ejection device and the floor of a cell affects the size of bubbles in the cell; that is, the bubbles decrease in size as the ejection devices are positioned closer to the cell floors. In some gas-liquid mixing applications, for example, it is desirable to position the ejection device within one diameter of the cell bottoms, where a "diameter" refers to the inside diameter of the expansion chamber 32.

With respect to impingement on the cell floors, we have observed what we call a hysteresis effect in flotation applications and believe that effect partly explains the transition Region II shown in FIG. 3. We have observed that, as the ejection energy is increased while maintaining the two-phase fluid density constant, a critical value is reached where a cell suddenly fills with bubbles and the free surface becomes quiet. Moreover, we have found that once the critical energy value is surpassed, we could thereafter reduce the ejection energy while maintaining a constant nozzle effluent density and that the cell would remain filled with bubbles until an energy value was reached below the prior critical value. In other words, the energy value at which the bubble distribution changes from uniform to non-uniform depends upon whether one is decreasing the energy from a point within Region I or whether one is increasing the energy from a point in Region III to reach a point within Region I. Thus, the boundary AB of Region I is the locus of energy values at which the preferred conditions will arise as the ejection energy rate is increased from a point in Region III and the dashed boundary DE of the transition Region II is the locus of points where the preferred conditions will cease as the ejection energy is decreased from a point within Region I. The hysteresis effect, we believe, may be closely related to the impingement of the ejected two-phase fluid on the cell floors. By taking advantage of that effect, we are able to reliably operate at values slightly inside the minimum energy boundary AB because even if the effluent density should decrease, say by shifting from point b" in Region I to b"' in Region II, the preferred conditions in the tank would still persist.

In view of the hysteresis effect, the curve AB can be understood to define the minimum energy levels at which one is assured of achieving the preferred conditions within the cells. In still other words, the minimum energy required for assurance of the preferred conditions is a function of the two-phase effluent density, and that function is shown by curve AB.

The FIG. 3 abscissa and ordinate values at which the flotation cells are operated can be determined by skilled workers in several ways. For example, the density of the ejected two-phase fluid can be calculated from the aforementioned expression. The liquid and gas flow rates into the ejection device 15 ($Q_L$ and $Q_A$, respectively) are readily measurable with a conventional venturi meter, a rotameter, a pitot-static device or the like, or are determinable from pump operating conditions. Knowing the tank volume, the gas and the liquid flow rates, and the density of the two-phase effluent, one can readily determine the kinetic energy rate $\frac{1}{2} mv^2/g$ the two-phase fluid per unit of tank volume, where "m" is defined as the two-phase fluid "mass" flow rate (in pounds weight per second) as determined by the density and pipe-geometry relationship, "v" is the effluent velocity of the two-phase mixture in feet per second and "g" is the gravitational constant 32.2 ft/sec$^2$. Here again, we emphasize that the ordinate values shown in FIG. 3 are in terms of the volume of the liquid held in a cell; thus, for example, if a cell volume is doubled and the two-phase effluent density is held constant, the two-phase effluent energy rate must also be doubled in order to maintain the preferred flotation conditions and to establish the same operating point in FIG. 3. Normally, the effluent energy rate of the two-phase fluid is adjusted by varying the speed or flow of the pump which supplies the liquid to the ejection devices 20, or by varying the fluid stagnation pressure at the ejection devices. We have determined the graph of FIG. 3 by tests conducted with tank volumes ranging from 0.83 to 500 cubic feet and believe the illustrated range applies to flotation cells over a 1000:1 volume range.

The method of operation of the illustrated machine may now be contrasted with the method of operation of conventional impeller-driven flotation machines. In such machines, impeller rotation aspirates gas into a liquid body, but also creates substantial agitation and shear within the liquid. Such conditions discourage flotation to the extent that the gas bubbles may have difficulty in remaining attached to the substance which is to be floated. With the machine of the present invention, by way of contrast, a natural hydraulically actuated effect is utilized to accomplish flotation or, more specifically, the complete filling and mixing of a contained liquid body with gas bubbles without violent agitation and with a minimum of shear turbulence in the flotation cells. The complete filling of the cells with gas bubbles and the circulation of the bubbles optimizes contact between the gas bubbles and material which is to be floated. It is very important to note that the hydraulic effect also allows the process to be carried out without baffles or other mechanical gas distribution means.

We claim:

1. A dispersed gas flotation machine wherein hydraulic effects are utilized to disperse gas bubbles throughout contained liquid comprising:
   a. A housing and a plurality of flotation cells, mounted adjacent one another in a horizontal series in said housing and each of said cells containing a liquid body with a free surface;
   b. means connected to said housing for introducing liquid for processing thereinto;
   c. means for transferring liquid from cell to cell;
   d. removal means for removing processed liquid from said housing;
   e. means for removing froth from the free surface of the liquid in said housing;
   f. a plurality of fluid ejection devices mounted one in each of said flotation cells in a position to expel a mixed fluid into the liquid contained in said cell, each said fluid ejection device including:
      (i) a hollow tubular expansion chamber member which has an open end through which the mixed fluid is ejected into the liquid in said cell and an opposite end;
      (ii) a liquid-carrying pipe sealingly connected in communication with said opposite end of said expansion chamber member;
      (iii) gas introduction means for introducing gas into the interior of said expansion chamber member for mixing with the liquid therein; and
   g. pump means connected to said removal means and to said liquid-carrying pipes to pump less than all of the processed liquid into said fluid ejection devices, whereby the processed liquid mixes with gas from said gas introduction means to form the mixed fluid which is ejected into the liquid body in each said cell of said plurality of cells to form a dispersion of gas bubbles in each said cell.

2. A dispersed gas flotation machine according to claim 1 wherein said removal means comprises a compartment connected in fluid-flow communication with one of said flotation cells to receive processed liquid from said cell, said compartment including no ejection device.

3. A flotation machine according to claim 1 wherein said housing includes two sidewalls, two endwalls, and a floor.

4. A flotation machine according to claim 3 including a launder box affixed to one sidewall of said housing to receive froth from the free surface of the liquid in said cells.

5. A flotation machine according to claim 3 including a plurality of spaced-apart partition walls which extend between said two sidewalls and above the free surface of the liquid to form said plurality of flotation cells.

6. A flotation machine according to claim 5 including underflow weirs formed in said partition walls.

7. A flotation machine according to claim 1 wherein said means for removing froth from the free surface of the liquid includes a plurality of rotary paddle wheels mounted one in each cell of said plurality of cells.

8. A flotation machine according to claim 1 wherein:
   (a) said removal means is:
      (i) a skimming compartment coupled to one of said flotation cells and contained in said housing; and,
      (ii) an outlet conduit coupled to said skimming compartment; and,
   (b) said pump means is:
      (i) a pump coupled to said outlet conduit; and,
      (ii) conduit means coupled between said pump and said plurality of fluid ejection devices to convey liquid therebetween.

9. A flotation machine according to claim 1 wherein said removal means and said pump means are constructed and arranged so that processed liquid from said housing is transferred directly to said fluid ejection devices without additional processing or treatment.

10. A dispersed air flotation machine according to claim 1 wherein the ratio of the inside diameter of said expansion chamber member to the inside diameter of said pipe ranges from about 1.5 to about 3.5.

11. A dispersed air flotation machine according to claim 1 wherein the ratio of the length of said expansion chamber member to its inside diameter is at least 2.

12. A dispersed air flotation machine according to claim 11 wherein said ratio of the length of said expansion chamber member to its inside diameter ranges from about 2 to about 15.

13. A dispersed air flotation machine according to claim 1 wherein said ejection devices are positioned above said cells to expel liquid downwardly thereinto from below the free surface of the contained liquid.

14. A machine according to claim 13 wherein each of said ejection devices is positioned such that its said open end is spaced from the floor of the associated cell by a distance at least equal to about the inside diameter of the expansion chamber member.

15. A dispersed gas flotation machine wherein hydraulic effects are utilized to disperse gas bubbles throughout contained liquid comprising:
   a. a housing and a plurality of flotation cells, mounted adjacent one another in a horizontal series in said housing and each of said cells containing a liquid body with a free surface;
   b. means connected to said housing for introducing liquid for processing thereinto;
   c. means for transferring liquid from cell to cell;
   d. removal means for removing processed liquid from said housing;
   e. means for removing froth from the free surface of the liquid in said housing;
   f. a plurality of fluid ejection devices mounted one in each of said flotation cells in a position to expel a mixed fluid into the liquid contained in said cell, each said fluid ejection device including:
      (i) a hollow tubular expansion chamber member which has an open end through which the mixed fluid is ejected into the liquid in said cell and an opposite end;
      (ii) a liquid-carrying pipe sealingly connected in communication with said opposite end of said expansion chamber member;
      (iii) gas introduction means for introducing gas into the interior of said expansion chamber member for mixing with the liquid therein;
   g. a manifold coupled in fluid-flow communication with said liquid-carrying pipes to convey processed liquid to said pipes; and
   h. a pump connected to said removal means and to said manifold to pump less than all of the processed liquid through said manifold to said fluid ejection devices, so that the processed liquid in said fluid ejection devices mixes with gas from said gas introduction means to form the mixed fluid which is ejected into the liquid body in each said cell to form a dispersion of gas bubbles in each said cell.

* * * * *